Patented June 8, 1948

2,442,837

UNITED STATES PATENT OFFICE 2,442,837

METHOD OF PREPARING HETEROCYCLIC ORGANIC COMPOUNDS

Robert B. Angier, Pearl River, N. Y., assignor, by mesne assignments, to American Cyanamid Company, New York, N. Y., a corporation of Maine No Drawing. Application February 5, 1946, Serial No. 645,705

9 Claims. (Cl. 260—250)

This invention relates to a new method of preparing organic compounds having useful biological properties.

The compounds and the process by which they are prepared in accordance with the present invention may be illustrated by means of the following equation:

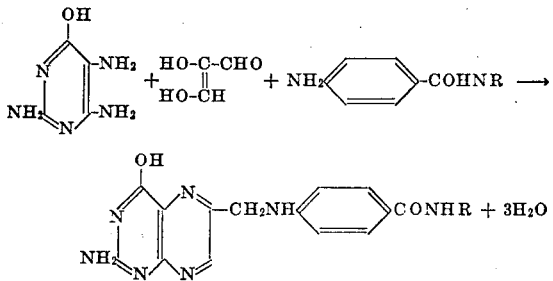

In these formulas the group —NHR represents the residue of an amino acid, as will appear in greater detail hereinafter.

The three intermediates shown in the above reaction are all known compounds whose preparation and properties are described in the chemical literature. The first intermediate, as illustrated, is commonly known as 2,4,5-triamino-6-hydroxy pyrimidine. This compound, however, is known to exist in one or more tautomeric forms, such as for example, 2,4,5-triamino-pyrimidone-6. This tautomer and the other tautomers which may exist may, as would be expected, be used in the same reaction under the same conditions to produce the same products. As will also appear obvious to those in the art, the final product may exhibit the same kind of tautomerism.

The second intermediate shown is commonly known as reductone and, in the tautomeric form illustrated, may be called 2,3-dihydroxy acrylaldehyde. This product may also exist in tautomeric form; for example, in the keto form in which it would be named 2-oxo-3-hydroxy propionaldehyde. Obviously, the various tautomers of reductone may be employed in the reaction to produce the desired products.

The third intermediate is an amide of amino benzoic acid. The preferred amides are those of amino acids, the radical —NHR representing the residue of an amino acid. This group is usually non-functional insofar as the reaction of the invention is concerned but is important in determining the biological characteristics of the product. The preferred amino acid residue is that of glutamic acid although other amino acid residues such as those of glycine, aspartic acid, leucine, alanine, iso-valine, cysteine and the like may be used. The group —NHR may also represent the residue of an amino acid having one or more peptid linkages. Such intermediates would include, for example, para-aminobenzoylglutamic acid, para-aminobenzoylglutamylglutamic acid, para-aminoglutamylglutamylglutamic acid, and the like and still others such as para-aminobenzoylglutamylglycylglutamic acid in which the amino acid residue is made up of more than one amino acid. As these amino acid amides possess free carboxyl groups it will be apparent that the salts and esters thereof may likewise be employed in the process.

The preferred products of the invention possess vitamin-like properties and appear to be necessary for, or stimulate the growth of, certain bacteria and higher forms of animal life. They are useful in stimulating haemoglobin formation and are useful in the treatment of granulocytosis and other related diseases. They are, generally speaking, yellow to reddish-brown crystalline solids, difficultly soluble in water and organic solvents.

The reaction may be conducted by mixing all of the three intermediates together at the same time or by causing a preliminary reaction to take place between the reductone and either the triamine or the aminobenzoic acid amide. The reaction may be connected in water or in an organic solvent, preferably a hydroxylated organic liquid such as ethyl alcohol, ethylene glycol, or the like. Other solvents such as acetone, benzene, formamide, etc. may also be used. The temperature of the reaction may vary considerably, from room temperature to about 160° C., the higher temperatures, that is above about 100° C., being preferred. The time required varies, of course, with the temperature and other conditions of the reaction.

Certain alkaline condensing agents such as sodium acetate, disodium phosphate, sodium formate, pyridine, dimethyl aniline, and the like may be used to give increased yields of product.

The invention will now be described in greater detail by means of the following examples. All parts are by weight unless otherwise indicated.

*Example 1*

Five parts of reductone, 9 parts of 2,4,5-triamino-6-hydroxy pyrimidine, and 17 parts of para-aminobenzoylglutamic acid were placed in 550 parts of ethylene glycol and heated for 15 minutes at 145° C. The solution was then cooled, diluted with three volumes of water, and filtered. The product was washed with water, methanol, and ether, and dried. Assay of the crude material proved it to contain substantial amounts of N-[4-}-[(2 - amino- 4 - hydroxy - 6 - pyrimido [4,5 - b]pyrazyl) methyl]-amino}benzoyl]glutamic acid. The purified product occurs as yellow crystals which have an index of refraction parallel to the length of the crystals of 1.559±0.003 and parallel to the width of the crystals of 1.744±0.003. The product decomposes when heated without melting.

Although it is not necessary that the product be highly purified for many of its important uses, one method of obtaining a highly purified material in crystalline form may be illustrated by the following general procedure. Other methods of purification, dependent upon the physical and chemical properties of the substance, may be devised. The crude reaction mixture, prepared as described above, is first dissolved in 0.2 N sodium hydroxide solution at a concentration equivalent to 400 micrograms γ/ml. Barium chloride is then added to 0.2 N and the mixture is stirred for ten minutes and filtered. Ethanol is added to the filtrate to a concentration of 20% and, after stirring, the solution is again filtered and the insoluble matter, if any, discarded. The excess barium in the filtrate is then precipitated by the addition of an equivalent amount of sulfuric acid, being careful to keep the mixture distinctly alkaline by the addition of sodium hydroxide, if necessary. After removal of the barium sulfate by filtration, the solution is diluted to 100 γ/ml. of the active compound and then adjusted to a pH of 7.0. The solution is again filtered and the filtrate is concentrated to a volume such that the active compound is present at a concentration of 200 γ/ml. This solution is extracted with four 10 volume portions of butanol which butanol extracts are discarded. The aqueous phase is then treated with an amount of activated charcoal equivalent to the total weight of the active compound present. The solution is filtered and charcoal discarded. The filtrate is then adjusted to a pH of 3.0 and heated to dissolve the active compound which may precipitate at this acidity. Additional water may be added, if necessary. The saturated solution is then allowed to cool to about 4° C. and the precipitated product is collected. It may be recrystallized by dissolving in hot water adjusted to a pH of 3, if desired.

*Example 2*

Five parts of reductone, 12 parts of para-aminobenzoylglutamic acid, and 550 parts of ethylene glycol were heated at 85° C. for 5 minutes. Then 100 parts of 2,4,5-triamino-6-hydroxy-pyrimidine were added and the mixture heated to 135° C. for 30 minutes. The solution was then cooled, diluted with three volumes of water, and filtered. The product was washed with water, methanol and ether and dried. Assay showed it to be identical with the product of Example 1.

*Example 3*

Fourteen parts of para-aminobenzoylglutamic acid was heated to 100° C. for 15 minutes with 5 parts of reductone and 550 parts of ethylene glycol. Ten parts of 2,4,5-triamino-6-hydroxy pyrimidine was then added and the mixture heated to 135° C. for 30 minutes. The solution was then cooled, diluted with three volumes of water and filtered. The filter cake was washed with water, methanol and ether and dried. Assay showed it to be the same product as that of the preceding examples.

*Example 4*

2.5 parts of reductone was depolymerized by dissolving in 70 parts of water and warming to 60° C. for 20 minutes while passing nitrogen through the solution. 3.5 parts of 2,4,5-triamino-6-hydroxy pyrimidine and 9.5 parts of sodium acetate were dissolved in 250 parts of 1 N acetic acid and filtered. These two solutions were mixed in an atmosphere of nitrogen at room temperature. After several hours the precipitate was filtered off, washed with water, methanol and ether, and dried.

One part of the above product, 1.4 parts of para-aminobenzoylglutamic acid, and 110 parts of ethylene glycol were combined and heated to 135° C. for 30 minutes. The solution was then cooled, diluted with two to four volumes of water, and filtered. The product, after washing and drying, was assayed and found to be the same as that of the preceding examples.

*Example 5*

The preceding example was repeated without the use of nitrogen gas. The final product obtained was the same.

*Example 6*

Sixteen parts of reductone was dissolved in 500 parts of water and allowed to stand at 50° C. for 10 minutes. The solution was then added slowly to a solution of 25 parts of 2,4,5-triamino-6-hydroxy pyrimidine and 60 parts of para-aminobenzoylglutamic acid in 2500 parts of water while stirring at 60° C. After standing an hour and cooling, it was filtered, washed with alcohol and ether, and dried. This crude product also contained N-[-4-}-[(2-amino-4-hydroxy-6-pyrimido[4,5-b]pyrazyl)methyl] - amino}benzoyl]-glutamic acid.

I claim:

1. A method of preparing N-[4-}-[(2-amino-4-hydroxy - 6 - pyrimido[4,5-*b*]pyrazyl)methyl]-amino}benzoyl]glutamic acid which comprises mixing together in a solvent 2,4,5-triamino-6-hydroxy pyrimidine, reductone, and para-aminobenzoylglutamic acid and thereafter recovering the said product.

2. A method of preparing N-[4-}-[(2-amino-4-hydroxy - 6 - pyrimido[4,5-*b*]pyrazyl)methyl]-amino}benzoyl]glutamic acid which comprises the steps of mixing together in an hydroxylated solvent 2,4,5-triamino-6-hydroxy pyrimidine, reductone, and para-aminobenzoylglutamic acid and heating the mixture at a temperature of about 100° C. or higher and thereafter recovering the said product.

3. A process in accordance with claim 2 in which the reductone and para-aminobenzoylglutamic acid are first mixed together.

4. A method of preparing N-[4-}-[(2-amino-4-hydroxy - 6 - pyrimido[4,5-*b*]pyrazyl)methyl]-amino}benzoyl]glutamic acid which comprises the steps of mixing together in an hydroxylated solvent 2,4,5-triamino-6-hydroxy pyrimidine, reductone, para-aminobenzoylglutamic acid and sodium acetate and heating the mixture at a temperature of about 100° C. or higher and thereafter recovering the said product.

5. A method of preparing a compound having in at least one of its tautomeric forms the formula:

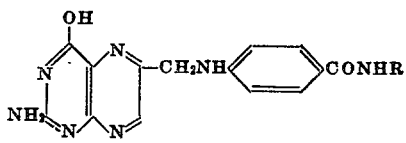

in which the group —NHR represents the radical of an amino acid which comprises mixing together in a solvent under reactive conditions 2,4,5-triamino-6-hydroxy pyrimidine, reductons and an amino acid amide of para-aminobenzoic acid and thereafter recovering the said product.

6. A process in accordance with claim 5 in which the group —NHR contains at least one radical of glutamic acid.

7. A method of preparing a compound having in at least one of its tautomeric forms the formula:

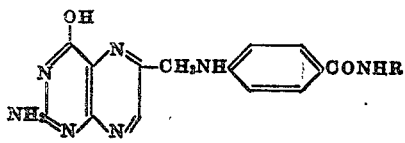

in which the group —NHR represents the radical of an amino acid having a peptid linkage which comprises mixing together in a solvent 2,4,5-triamino-6-hydroxy pyrimidine, reductone and a compound having the formula

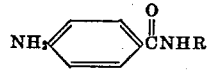

in which —NHR is as defined above and recovering the said product.

8. A method in accordance with claim 7 in which the group —NHR represents the radical of glutamylglutamylglutamic acid.

9. A method which comprises the steps of mixing together in a hydroxylated solvent an ester of para-aminobenzoylglutamic acid, reductone, and 2,4,5-triamino-6-hydroxy pyrimidine and after reaction thereof recovering the corresponding ester of N-[4-{[(2-amino-4-hydroxy-6-pyrimido [4,5-b]pyrazyl)methyl] - amino}benzoyl] glutamic acid.

ROBERT B. ANGIER.